United States Patent
Kodawara

(10) Patent No.: US 9,663,098 B2
(45) Date of Patent: May 30, 2017

(54) CONTROL SYSTEM FOR A PLUG-IN HYBRID VEHICLE

(71) Applicant: Nissan Motor Co., Ltd., Yokohama-shi, Kanagawa (JP)

(72) Inventor: Tomoyuki Kodawara, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 14/787,867

(22) PCT Filed: Mar. 26, 2014

(86) PCT No.: PCT/JP2014/058509
§ 371 (c)(1),
(2) Date: Oct. 29, 2015

(87) PCT Pub. No.: WO2014/192392
PCT Pub. Date: Dec. 4, 2014

(65) Prior Publication Data
US 2016/0082943 A1 Mar. 24, 2016

(30) Foreign Application Priority Data
May 29, 2013 (JP) .................................. 2013-112747

(51) Int. Cl.
*B60W 20/00* (2016.01)
*B60K 6/48* (2007.10)
(Continued)

(52) U.S. Cl.
CPC ............... *B60W 20/00* (2013.01); *B60K 6/48* (2013.01); *B60K 6/543* (2013.01); *B60L 1/00* (2013.01);
(Continued)

(58) Field of Classification Search
CPC ............ B60W 10/26; B60W 2710/06; B60W 2710/244; B60W 2510/244; B60L 11/14;
(Continued)

(56) References Cited

U.S. PATENT DOCUMENTS 5,705,859 A 1/1998 Karg et al.
7,750,607 B2 * 7/2010 Nakajima ............... B60R 16/03
320/136
(Continued)

FOREIGN PATENT DOCUMENTS

JP 2008-7003 A 1/2008
JP 2008-141855 A 6/2008
(Continued)

*Primary Examiner* — Redhwan K Mawari
*Assistant Examiner* — Edward Torchinsky
(74) *Attorney, Agent, or Firm* — Global IP Counselors, LLP

(57) ABSTRACT

A control system for a plug-in hybrid vehicle includes a drive system including a starter motor, a transverse engine, and a motor/generator, and a power supply system including a high voltage battery, a capacitor, and a hybrid control module that controls charging and discharging of the capacitor. A cell voltage monitor for detecting the voltage of the capacitor is provided, the control system being capable of normal external charging and quick external charging of the high voltage battery. The hybrid control module starts the starter, performs charge and discharge control, and maintains a capacitor voltage at and above a starter start-up enabling voltage at which it is possible to start the starter during ignition off and external charging is set to the quick external charging.

10 Claims, 4 Drawing Sheets

(51) Int. Cl.
*B60K 6/543* (2007.10)
*B60L 11/14* (2006.01)
*B60W 10/26* (2006.01)
*B60L 1/00* (2006.01)
*B60L 7/14* (2006.01)
*B60L 7/24* (2006.01)
*B60L 11/00* (2006.01)
*B60L 11/18* (2006.01)
*B60W 20/13* (2016.01)
*F02D 29/02* (2006.01)
*F02N 11/08* (2006.01)

(52) U.S. Cl.
CPC ............. *B60L 1/003* (2013.01); *B60L 7/14* (2013.01); *B60L 7/24* (2013.01); *B60L 11/005* (2013.01); *B60L 11/14* (2013.01); *B60L 11/1816* (2013.01); *B60L 11/1861* (2013.01); *B60L 11/1868* (2013.01); *B60L 11/1874* (2013.01); *B60W 10/26* (2013.01); *B60W 20/13* (2016.01); *F02D 29/02* (2013.01); *F02N 11/0862* (2013.01); *B60L 2210/12* (2013.01); *B60L 2240/34* (2013.01); *B60L 2240/36* (2013.01); *B60L 2240/545* (2013.01); *B60L 2240/547* (2013.01); *B60L 2240/549* (2013.01); *B60L 2260/26* (2013.01); *B60W 2510/244* (2013.01); *B60W 2710/06* (2013.01); *B60W 2710/244* (2013.01); *B60Y 2400/114* (2013.01); *B60Y 2400/214* (2013.01); *Y02T 10/6221* (2013.01); *Y02T 10/70* (2013.01); *Y02T 10/7005* (2013.01); *Y02T 10/7022* (2013.01); *Y02T 10/7044* (2013.01); *Y02T 10/7066* (2013.01); *Y02T 10/7072* (2013.01); *Y02T 10/7077* (2013.01); *Y02T 10/7233* (2013.01); *Y02T 90/127* (2013.01); *Y02T 90/14* (2013.01); *Y10S 903/907* (2013.01)

(58) Field of Classification Search
CPC ............. B60L 2240/34; B60L 2260/26; B60L 2240/547; B60L 2240/545; B60L 2240/36; B60L 2240/549; B60L 2210/12; Y10S 903/907; Y02T 90/127; Y02T 90/14; Y02T 10/70; Y02T 10/7072; Y02T 10/7066; Y02T 10/7233; Y02T 10/7044; Y02T 10/7022; Y02T 10/7005; Y02T 10/6221; Y02T 10/7077; B60Y 2400/114
See application file for complete search history.

(56) References Cited

U.S. PATENT DOCUMENTS

| | | | |
|---|---|---|---|
| 9,415,732 B2 * | 8/2016 | Kakiuchi | B60R 16/03 |
| 9,452,753 B2 * | 9/2016 | Kodawara | B60L 1/003 |
| 2016/0082946 A1 * | 3/2016 | Kodawara | B60K 6/28 701/22 |
| 2016/0089981 A1 * | 3/2016 | Kodawara | B60L 1/003 307/10.1 |
| 2016/0107635 A1 * | 4/2016 | Kodawara | B60K 6/48 701/22 |

FOREIGN PATENT DOCUMENTS

| | | |
|---|---|---|
| JP | 2012-96712 A | 5/2012 |
| JP | 2012-167627 A | 9/2012 |

* cited by examiner

CONTROL SYSTEM FOR A PLUG-IN HYBRID VEHICLE

CROSS-REFERENCE TO RELATED APPLICATIONS

This application is a U.S. National stage application of International Application No. PCT/JP2014/058509, filed Mar. 26, 2014, which claims priority based on Japanese Patent Application No. 2013-112747, filed in the Japan Patent Office on May 29, 2013, the contents of each of which is hereby incorporated herein by reference.

BACKGROUND

Field of the Invention

The present invention relates to a control system for a plug-in hybrid vehicle in which, as an external charging method, both normal external charging and rapid external charging are available.

Background Information

Conventionally, a power storage device is known in which the voltage of the power storage device is controlled between a preset lower limit voltage and a preset holding or sustaining voltage when the vehicle is not in use while the storage device is configured to be fully charged when the vehicle recognizes the driver though a vehicle driver authentication mechanism (for example, see JP 2008-141855 A).

SUMMARY

However, in the conventional device, when the driver gets out of the vehicle after turning the ignition OFF and performs quick external charging at a charge station, the voltage of a storage battery is held low somewhere between a predetermined lower limit voltage and a predetermined sustain voltage due to the driver being undetected. Thus, when the driver, after completion of the quick external charging operation, gets in the vehicle and turns on the ignition for a quick vehicle start, it is necessary for the driver to wait until the storage battery is fully charged.

The present invention was made in consideration of the above problem and aims to provide a control system for a plug-in hybrid vehicle that can shorten a time required for allowing an engine to start-up by a starter motor in response to ignition being turned on.

In order to achieve the above object, the present invention has a starter motor, an engine, and a motor/generator in the driving system. As power supply system, a high voltage battery for power supply of the motor/generator, a capacitor for power supply of the starter motor, and a capacitor charge and discharge control unit for controlling charging and discharging of the capacitor are provided. In a control system for a plug-in hybrid vehicle in which both normal external charging and quick external charging are available as an external charging method to a high voltage or high power battery, an engine start-up control unit is provided, which is configured to crank the engine to start-up using the starter motor powered by the capacitor. Further, a capacitor voltage detection device is provided for detecting the voltage of the capacitor.

The capacitor charge and discharge control unit maintains the capacitor voltage that is equal to the starter start-up enabling voltage at which the engine may be started through the starter start-up.

Therefore, when the ignition is off and the external charge is effected by the quick external charging, the capacitor charge and discharge control unit is configured to maintain the capacitor voltage at the starter start-up enabling voltage or more at which the starter start-up is possible. In other words, in the case of normal external charging, since charging to the high voltage battery requires substantial time, it is considered that the vehicle does not start for a while. On the other hand, however, in the case of quick external charging, it is contemplated that battery charging is complete within a short time, and, upon completion of charging, the vehicle starts immediately. Thus, when the external charge is performed through quick external charging with the ignition being off, by maintaining the capacitor voltage to the starter start-up enabling voltage or more at which the starter start-up is available, the condition is established in which the vehicle is capable of immediate start after ignition is turned on.

Consequently, when the ignition is ON, it is possible to shorten a required time for starting up the engine so as to allow the starter start-up by the starter motor.

BRIEF DESCRIPTION OF THE DRAWINGS

Referring now to the attached drawings which form a part of this original disclosure.

DETAILED DESCRIPTION OF THE EMBODIMENTS

Figure 1:
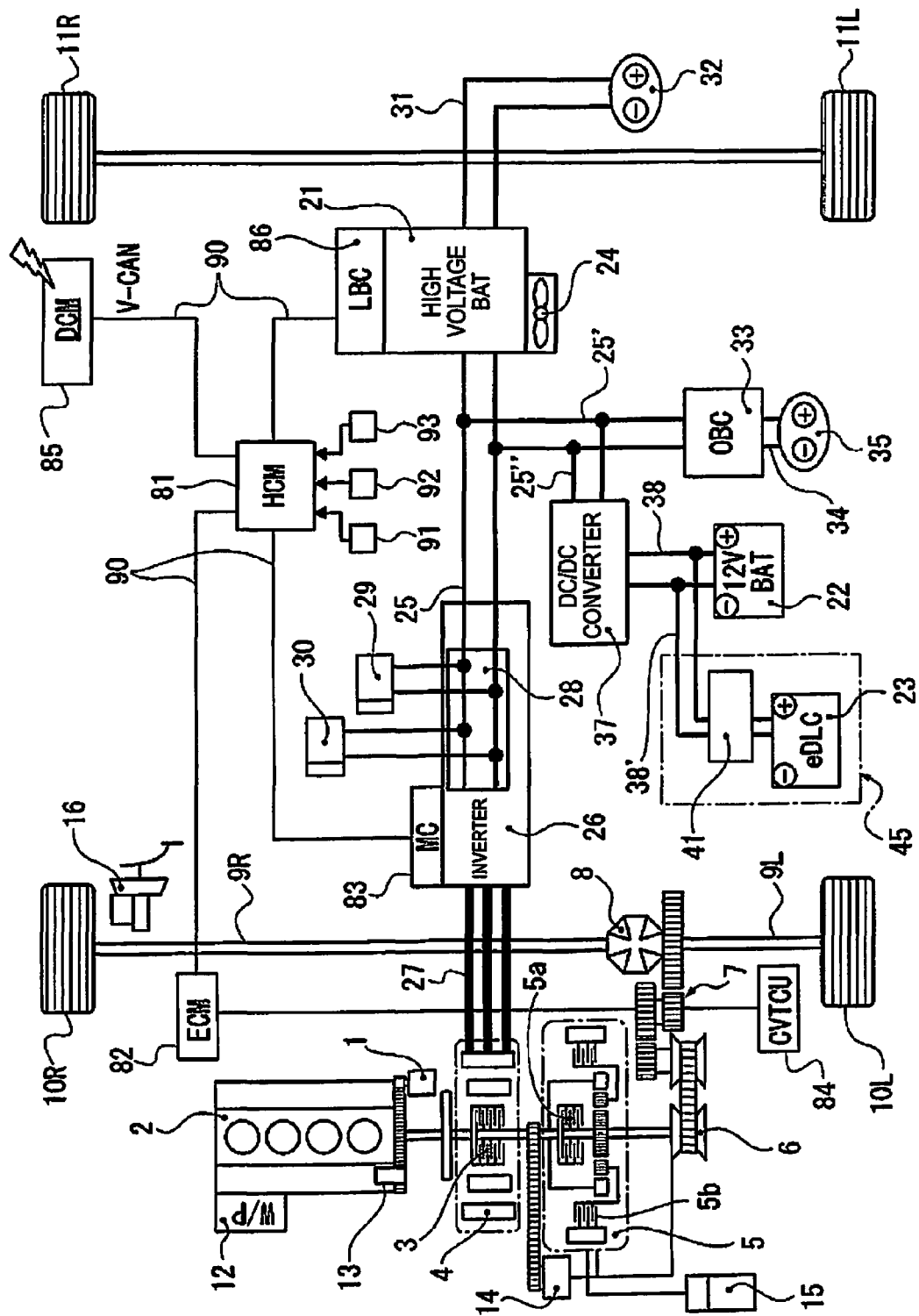
FIG. 1 is an overall system diagram showing an FF plug-in hybrid vehicle to which the control system of a first embodiment is applied.

Below, the best mode for implementing the control system of the plug-in hybrid vehicle according to the present invention will be described based on a first embodiment shown in the drawings.

First Embodiment

First, a description is given of the configuration. The configuration of the FF plug-in hybrid vehicle employing the control system of the first embodiment (an example of a plug-in hybrid vehicle) is described separately in a "Drive System Configuration", "Power Supply System Configuration", "Control System Configuration", and "Detailed Configuration of Capacitor Charge and Discharge Control".

Drive System Configuration

FIG. 1 is an overall system diagram showing an FF plug-in hybrid vehicle. Below, a description is given of a drive system configuration of the FF plug-in hybrid vehicle.

As shown in FIG. 1, as the drive system, a starter motor 1 (abbreviated as "M"), a transverse engine (abbreviated as "ICE"), a first clutch 3 (abbreviated as "CL1"), a motor/generator 4 (abbreviated as "M/G"), a second clutch 5 (abbreviated as "CL2"), and a belt-type continuously variable transmission (abbreviated as "CVT") are provided. An output axis of the belt-type CVT 6 is drivingly connected to left and right front wheels 10R, 10L via a final reduction gear train 7, a differential gear 8, and the left and right drive shafts 9R, 9L. Note that the left and right rear wheels 11R, 11L are configured as driven wheels.

The starter motor 1 has a gear meshing with an engine starting gear provided on the crankshaft of the engine 2 and is powered by a capacitor 23 to be described below and forms a cranking motor for driving or rotating the crankshaft when the engine is started.

The transverse engine 2 is an engine which is arranged in the front room with the crankshaft direction in the vehicle width direction, and has an electric water pump 12, a crank shaft rotation sensor 13 for detecting the reverse rotation of the engine 2 of the transverse engine 2.

The first clutch 3 is a hydraulic dry, multi-plate friction clutch interposed between the transverse engine 2 and the motor/generator 4, which is subject to selective control by a first clutch oil pressure to complete engagement/slip-engagement/release.

The motor/generator 4 is a permanent magnet synchronous motor of three-phase alternating current type connected to the transverse engine 2 via the first clutch 3. The motor/generator 4 is driven by a power supply of the high voltage battery 21 to be described below. The starter coil of the motor/generator is connected via an AC harness to an inverter 26, which converts a direct current to a three-phase current during a driving operation while converting the three phase current to direct current during regeneration.

The second clutch 5 is a hydraulic wet-type multi-plate friction clutch interposed between the motor/generator 4 and the left and right front wheels representing driving wheels, and is subject to selective control by a second clutch hydraulic pressure to the full engagement/slip-engagement/release. The second clutch 5 makes use of a forward clutch 5a and a reverse brake 5b for a forward-reverse switching mechanism. That is, during forward traveling, the forward clutch 5a acts as the second clutch 5, while, during backward traveling, the reverse brake 5b serves as the second clutch 5.

The belt-type continuously variable transmission 6 is a transmission for obtaining a stepless or continuous speed change ratio by changing the winding diameter of the belt by shift hydraulic pressures to the primary fluid chamber and the secondary fluid chamber. The belt-type continuously variable transmission 6 includes a main oil pump 14 (mechanical drive), a sub oil pump 15 (motor driven), a control valve unit (not shown) that produces a first clutch hydraulic pressure and a shift hydraulic pressure using as a source pressure a line pressure that is obtained by pressure regulating the pump discharge pressure.

The first clutch 3, the motor/generator 4, and the second clutch 5 constitutes a one-motor-two-clutch drive system which operates, as main drive modes according to the drive system, in "EV mode" and in "HEV mode". The "EV mode" represents an electric vehicle mode in which the motor/generator only is provided as the driving source with the first clutch 3 released and the second clutch engaged. Travelling in the "EV mode" is referred to as the "EV running". The "HEY mode" represents a hybrid vehicle mode in which the transverse engine 2 and the motor/generator 4 act as power source with both clutches 3, 5 engaged. Travelling in the "HEV mode" is referred to as "HEV running".

The motor/generator 4 is equipped with a regenerative cooperative brake unit 16 which controls the total braking torque during braking operation basically in response to a regenerative operation during braking operation, The regenerative cooperative brake unit 16 includes a brake pedal, an electric booster, and a master cylinder. The electric booster carries out a coordinated control of regenerative part/hydraulic part allocation such that, during braking operation, the amount that is obtained by subtracting from a required braking force represented by a brake pedal operation amount an available regenerating braking force will be borne by the hydraulic braking force.

Power Supply System Configuration

Figure 2:
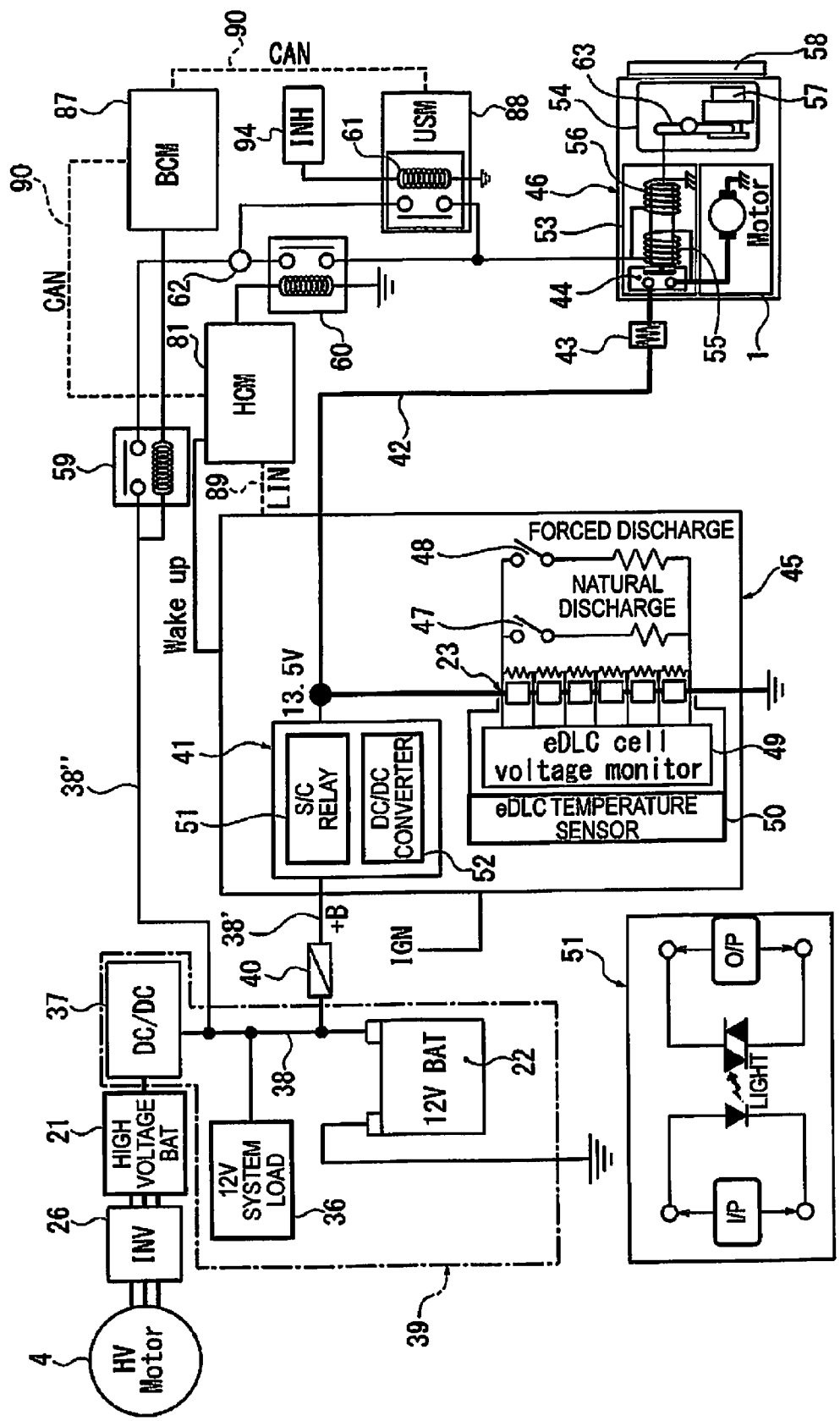
FIG. 2 is a power supply circuit diagram showing a power supply system arrangement with a focus on a starter power supply source of the FF plug-in hybrid vehicle to which the control system of the first embodiment is applied.

FIG. 1 is an overall system diagram showing an FF plug-in hybrid vehicle, and FIG. 2 is a power supply circuit diagram with focus on the starter power supply. Below, with reference to FIGS. 1 and 2, a description is given of the power supply system configuration for the FF plug-in hybrid vehicle.

As the power supply system, as shown in FIG. 1, a high voltage battery 21 as a motor/generator power, and a 12V battery 22 as a 12V system load power, and a capacitor 23 as a starter power supply, respectively.

The high voltage battery 21 is a rechargeable or secondary battery mounted as a power source of the motor/generator 4, and uses, for example, lithium ion battery. One or more of cell modules formed by laminating a plurality of cells is stored within a battery case. A junction box is accommodated in the high voltage battery 21, which aggregates relay circuits for supply/cutoff/distribution of high power. Further, a battery temperature adjustment unit 24 for air-conditioning function and lithium battery controller 86 for monitoring the battery charge capacity (battery state of charge; battery SOC) and the battery temperature are attached.

The high voltage battery 21 and the motor/generator 4 are connected through a DC harness 25, an inverter 26, and an AC harness 27. A junction box 28 which aggregates relay circuits of the supply/cutoff/distribution for high voltage is accommodated in the inverter 26. Further, the air-conditioning circuit 29, an electric air compressor 30, and a motor controller 83 to perform a power running/regenerative control are attached. In other words, the inverter 26 converts the direct current from the DC wiring harness into a three phase alternating current to the AC wiring harness 27 when the inverter 26 drives the motor/generator 4 due to discharge of the high voltage battery 21 during a driving mode. When the high voltage battery 21 is charged during a regenerative mode by power of the motor/generator 4, the three phase AC from the AC wiring harness 27 is converted into the direct current to the DC wiring harness 25.

In addition to a rapid external charging port 32 connected to the high voltage battery 21 through a DC harness 31, a normal external charging port 35 is connected to the high voltage battery 21 via a DC branch harness 25', a charger 33 and the AC harness 34. The charger 33 functions to a voltage conversion and AC/DC conversion, When rapid external charging, for example, external charging performed by connecting a connector plug of a charging station installed in the road or the like to the rapid external charging port 32 (rapid external charging). During normal external charging, for example, a connector plug from the household power supply is connected to the normal external charging port 35 for external charge (normal external charging).

The 12V battery 22 is a rechargeable secondary battery mounted as a power source of 12V system load 36 representing the other auxiliary equipment except the starter motor 1. For example, a lead battery is used which is generally mounted in the engine vehicle. The high voltage battery 21 and the 12V battery 22 are connected via DC branch harness 25", a DC/DC converter 37, and a battery harness 38. The DC/DC converter 37 is intended to convert the several hundred volts voltage from the high voltage battery 21 to 12V. By controlling the DC/DC converter by the hybrid control module 81, the charge capacity of the 12V battery is configured to be managed.

The capacitor 23 is a storage device that is mounted as a dedicated power supply of the starter motor 1. A capacitor called as an electric double layer capacitor (eDLC: electric Double Layer Capacitor) is used, which has a large capacitance and excellent characteristics in quick charging and discharging performance. As shown in FIG. 2, the auxiliary load power supply system 39 and the capacitor 23 are connected via a battery branch harness 38' provided with a fuse 40 and a capacitor charging circuit 41. The capacitor 23 and the starter motor 1 are connected via a capacitor harness 42, a resistor 43 and a relay switch 44. In addition, a DLC unit 45 is configured by the capacitor 23 and the capacitor charging circuit 41 while a starter unit 46 is configured by the starter motor 1, the relay switch 44, and the like. Below, a description of the detailed configuration of the DLC unit 45 and the starter unit 46 is given below.

As shown in FIG. 2, the DCL unit 45 includes the capacitor 23, a capacitor charging circuit 41, a self-discharge switch 47, a forced discharge switch 48, a cell voltage monitor 49 (the capacitor voltage detecting unit), and a capacitor temperature sensor 50.

The capacitor 23 is formed by connecting a plurality of DLC cells in series/parallel. The self-discharge switch 47, the forced discharge switch 48, and the capacitor temperature sensor 50 are disposed on both ends of the plurality of DLC cells in parallel. Further, the cell voltage monitor 49 is provided parallel to each of DLC cells so as to detect a cell voltage (=capacitor capacity) of each cell of the plurality of DLC cells.

The capacitor charging circuit 41 is constituted by a DC/DC converter circuit integrating semiconductor switching relays (combination circuit of switching elements, choke coils, capacitors, and a diode). The capacitor charging circuit 41 includes a semiconductor relay 51 and a DC/DC converter 52 controlled by the hybrid control module 81. The semiconductor relay 51 is a non-contact relay with light semiconductor switching elements, for example, as shown schematically in the lower left portion in FIG. 2, called as a photo-coupler for transmitting optical signals in the space of the insulated input and output. The semiconductor relay 51 has a switching function to connect or disconnect the capacitor 23 to or from the auxiliary load power supply system 38. The DC/DC converter 52 is configured to subdivide a DC input into pulse current by the switching element and connect these to obtain the direct current output of required voltage. Thus the DC/DC converter includes the function of converting the 12V direct current to the 13.5 V direct current as well as switching the capacitor charge current.

The starter unit 46 includes a starter motor 1, a relay switch 44, an electromagnetic actuator 53, and a pinion shifting mechanism 54.

The electromagnetic actuator 53, by an electromagnetic force generated by energizing the two coils 55 and 56 causes the pinion 57 to a position meshing with the ring gear 58 in addition to turning the relay switch 44 on. When cutting off the current, in addition to turning off the relay switch 44, the pinion 57 will be shifted to a position released from meshing with the ring gear 58. Note that the ring gear 58 is mounted to a crankshaft of the transverse engine 2. The auxiliary load power supply system 39 and two coils 55, 56 are connected via a battery branch harness 38" provided with a starter cutoff relay 59, a HEV/IS/relay 60, and a starter relay 61. The energization/shut-off of the starter cutoff relay 59 is carried out by a body control module 87. The energization/shut-off the HEV/IS/relay 60 is made by the hybrid control module 81. The energization/shut-off of the starter relay 61 is made by an under-hood switching module 88. Note that, at a crossing position of the battery branch harness 38", a voltage sensor 62 for diagnosing the relay is provided.

The pinion shifting mechanism 54 includes a pinion 57 which is axially moveable relative to the motor shaft of the starter motor 1 and a shift lever connected at its one end to an electromagnetic actuator 53 and fitted at the other end into the shift groove of the pinion 57.

Control System Configuration

Figure 3:
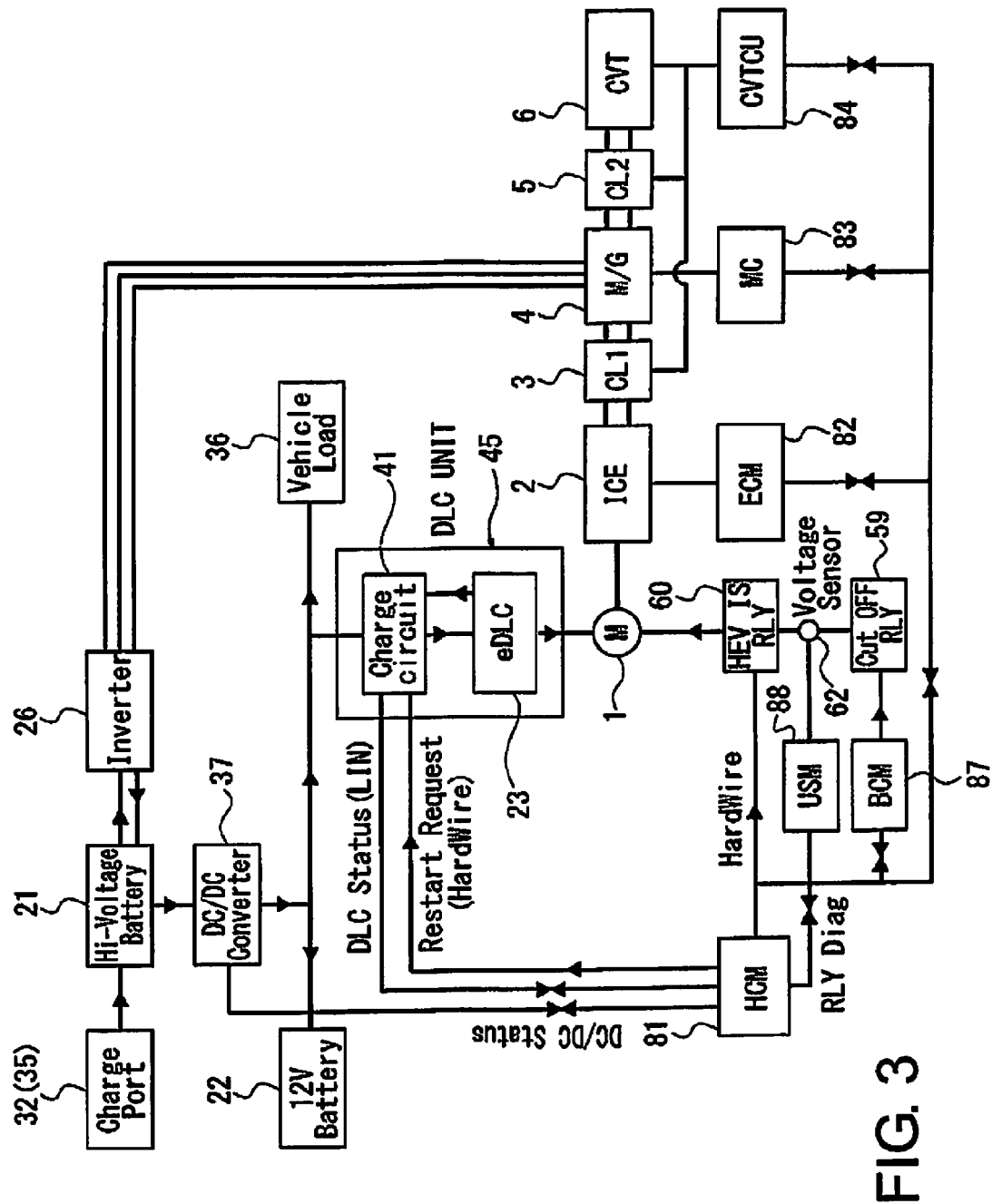
FIG. 3 is a block diagram showing a control system configuration of the FF plug-in hybrid vehicle to which the control system of the first embodiment is applied.

FIG. 1 shows the overall system of the FF plug-in hybrid vehicle. FIG. 2 shows the power system configuration around the starter power supply, FIG. 3 shows a control system configuration. Hereinafter, based on FIGS. 1 to 3, illustrating a control system configuration of the FF plug-in hybrid vehicle.

As shown in FIGS. 1 to 3, as the control system, the hybrid control module 81 (abbreviated as "HCM") is provided as an integrated control unit that controls appropriately the energy consumed by the overall vehicle. An engine control module 82 (abbreviated as "ECM"), the motor controller 83 (abbreviated as "MC"), a CVT control unit 84 (abbreviated as "CVTCU") are provided as control units connected to the hybrid control module 81. Further, a data communication module 85 (abbreviated as "DCM"), a lithium battery controller 86 (abbreviated as "LBC") are provided. In addition, the body control module 87 (abbreviated as "BCM") and an under-hood switching module 88 (abbreviated as "USM") are provided. These control units are connected so as to be bi-directionally communicative through a CAN communication line 90 (CAN is an abbreviation of "Controller Area Network") except for a LIN communication line 89 (LIN: abbreviation for Local Interconnect Network) through which the hybrid control module 81 and the DCL unit 45 are connected each other.

The hybrid control module 81 executes various controls based on input information from each control unit, ignition switch 91, accelerator pedal opening sensor 92, a vehicle speed sensor and the like. Among them, the control that is intended to drive a FF plug-in hybrid vehicle for which external charging is available at a high fuel consumption efficiency is referred to as the selection control of the running mode ("CD mode" and "CS mode") based on a battery SOC of the high voltage battery 21 (Running Mode Selection Control Unit).

During the "CD mode (Charge Depleting mode)", in principle, a priority is placed on an EV mode in which power of the high voltage battery is consumed, and the "CD mode" is selected during a period in which the battery SOC decreases from the full SOC to a predetermined SOC. However, in a high load running so that the driving force would be insufficient in EV running, the HEV running mode is performed exceptionally. Basically, the starting operation of the transverse engine 2 during the "CD mode" being selected, start by the starter motor 1 (starter start-up) is a basic operation. The start by the motor/generator 4 (M/G start) is thus held exceptional.

The "CS mode (Charge Sustain mode)" refers to a mode in which, in principle, a priority is placed on the HEV running to maintain the power of the high voltage battery 21, and is selected as the battery SOC of the high voltage battery 21 is below the preset SOC. That is, when the battery SOC of the high voltage battery 21 is required to be sustained or maintained in a predetermined range, the HEV running is carried out by an engine power to generate the motor/generator 4. Note that the predetermined mode switching threshold, i.e. the preset SOC is set such that between a value from the CD mode to the CS mode and a value from the CS mode to the CD mode a hysteresis is provided.

The hybrid control module 81, in addition to the selection control between the "CD mode" and "CS mode", performs an engine start-up control by the starter motor 1, a charging control to charge the capacitor 23, and the discharge control from the capacitor 23.

Also, starter related controls such as below will be carried out.

(A) Time reduction control from starting the engine until the starter start-up permission.
(B) Time reduction control from the ignition on until the starter start-up permission
First Embodiment
(C) Deterioration progress suppression control of the capacitor 23
(D) High temperature/low temperature countermeasure control of the capacitor 23.
(E) Voltage sag prevention control of the vehicle auxiliary equipment.

The engine control module 82 performs a fuel injection control, an ignition control, a fuel-cut control, etc. of the transverse engine 2. The motor controller 83 performs a power driving control and regenerative control of the motor generator 4 by the inverter 26. The CVT control unit 84 performs an engagement pressure control of the first clutch 3, an engagement pressure control of the second clutch 5, a shifting hydraulic pressure control of the belt-type continuously variable transmission 6, etc. The data communication module 85, in response to remote operation of a switch of a portable remote control key and the communication being established between the portable remote control key, performs, for example, control of the locking/unlocking of a charge port lid and/or a connector locking mechanism. The lithium battery controller 86 manages a battery SOC and a battery temperature. The body control module 87 controls energization/de-energization of a starter cutoff relay 59. Finally, the under-hood switching module 87 performs energization/de-energization of a starter relay 61 incorporated therein based on a range select signal from an inhibitor switch 94.

Detailed Configuration of Capacitor Charge and Discharge Control

Figure 4:
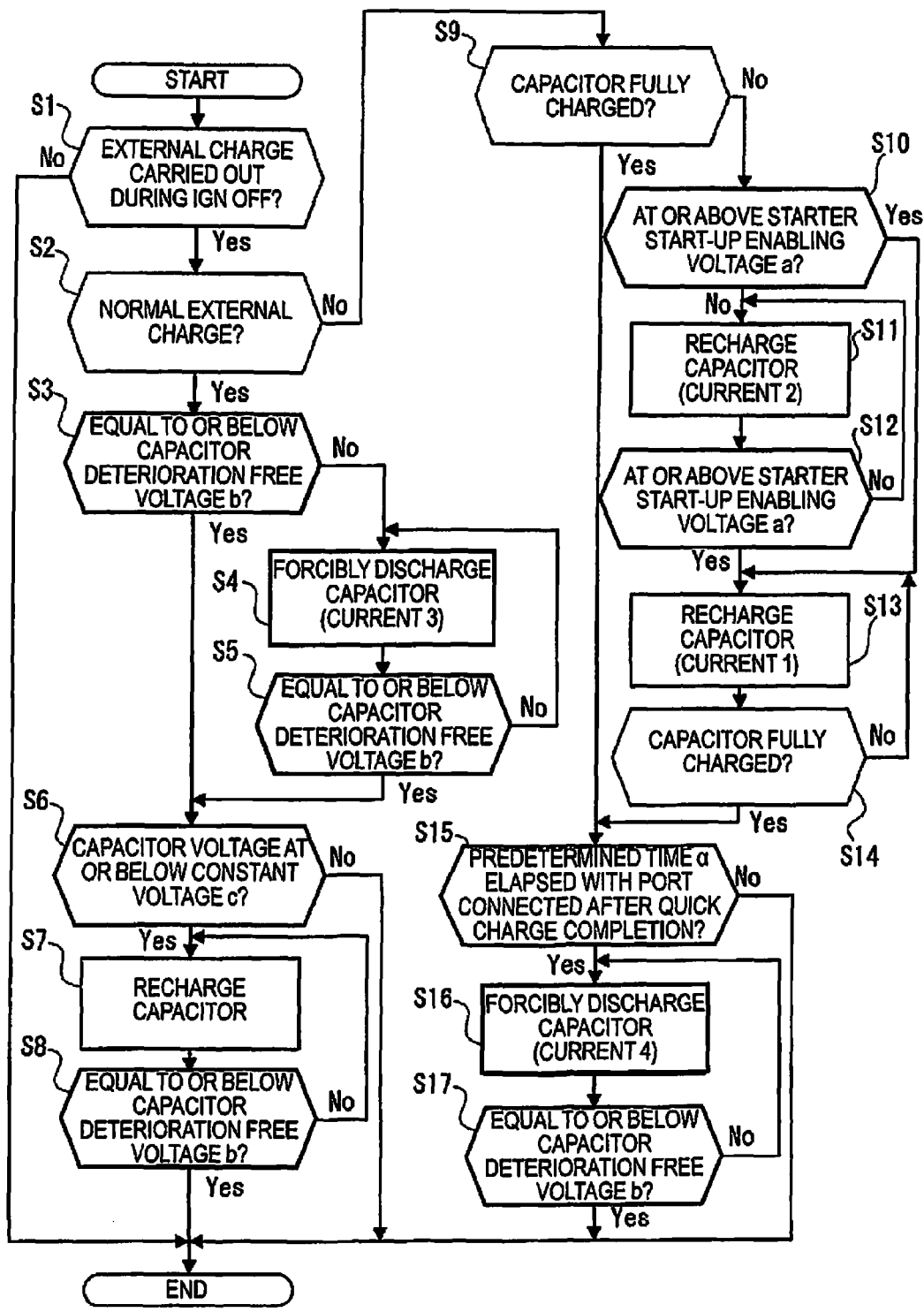
FIG. 4 is a flowchart showing a flow of a capacitor charge and discharge control process executed by a hybrid control module of the first embodiment.

FIG. 4 shows a capacitor charge and discharge control processing flow executed by the hybrid control module 81 (capacitor charge and discharge control unit). Below, a description is given of each step representing a capacitor charging and discharging control processing configuration.

In step S1, it is determined whether an external charge has taken place during ignition switch off. If Yes (external charge done during IGN off), control proceeds to step S2, while, if NO (no external charge during IGN off, control ends.

In step S2, subsequent to the determination in step S1 confirming the external charge during IGN off, it is determined whether or not the external charge that has taken place is a normal external charge. If Yes (normal external charge), control proceeds to step S3, while in the case of No (quick external charge), control proceeds to step S9.

In step S3, subsequent to the determination in step S2 confirming the normal external charge, it is determined whether the capacitor voltage detected by a cell voltage monitor 49 is equal to or less than a deterioration free voltage b, at which deterioration does not proceed.

If Yes (capacitor voltage≤voltage b), control proceeds to step S6, whereas, in the case of No (capacitor voltage>voltage b), control proceeds to step S4.

Here, the "voltage b at which deterioration does not proceed or deterioration free voltage" is set to 6.0 V in the case of six cells connected in series, since it has been discovered that the degradation or deterioration would not proceed if per cell capacitor 23 is less than 1V.

In step S4, subsequent to the determination in Step S3 or S5 confirming that capacitor voltage>voltage b, a normal discharge current 3 is selected as the discharge current, the forced discharge switch 48 is closed, and a forced discharge of the capacitor 23 is performed with the current 3. Thereafter, control proceeds to step S5.

In step S5, subsequent to the forced discharge (with current 3) of the capacitor in step S4, it is determined whether or not the capacitor voltage detected by the cell voltage monitor 49 is equal to the deterioration free voltage b or below, at which deterioration does not proceed. If Yes (capacitor voltage≤voltage b), control proceeds to step S6, while, in the case of No (capacitor voltage>voltage b), control returns to step S4.

In step S6, subsequent to the determination in step S3 or S5 that the capacitor voltage≤voltage b, it is determined whether or not the capacitor voltage detected by the cell voltage monitor 49 is equal to or less than a constant voltage c. If Yes (capacitor voltage≤constant voltage c), control proceeds to step S7, while, if NO (capacitor voltage>constant voltage c IGN ON), control ends.

In step S7, subsequent to the determination in step S6 that capacitor voltage≤constant voltage c, or, the determination in step S8 that capacitor voltage≠voltage b, the normal current 1 (for example, 15 A) is selected as charge current to recharge the capacitor 23 with current 1, and control proceeds to step S8.

In step S8, subsequent to the capacitor recharge (with current 1) in step S7, it is determined whether or not the capacitor voltage detected by the cell voltage monitor 49 falls below the deterioration free voltage b as which deterioration does not proceed. If Yes (capacitor voltage=voltage b), control ends, whereas, if No (capacitor voltage≠voltage b), control returns to step S7.

In step S9, subsequent to the determination confirming quick external charging in step S2, it is determined whether or not the capacitor is fully charged. If Yes (capacitor fully charged), process proceeds to step S15. If No (capacitor not yet fully charged), control proceeds to step S10.

In step S10, subsequent to the determination in step S9 confirming that the capacitor is not fully charged, it is determined whether or not the capacitor voltage detected by the cell voltage monitor 49 is equal to or more than the starter start-up enabling voltage a. If Yes (capacitor voltage≥starter start-up enabling voltage a), control proceeds to step S13, while, if No (capacitor voltage<starter start-up enabling voltage a), control proceeds to step S11.

Here, the "the starter start-up enabling voltage a" is set to about 12.5 V representative of a target time or less for a required cranking time due to the starter start-up, when such a capacitor 23 is used, which exhibits about 13.5 V at full charge state, for example.

In step S11, subsequent to the determination in step S10 or S12 confirming that capacitor voltage<starter start-up enabling voltage a, current 2 (for example, 20 A) is selected as charge current, which is higher than the normal current 1 (for example 15 A) for recharge of the capacitor 23, and control proceeds to step S8.

In step S12, subsequent to the recharging (with current 2) in step S11, it is determined whether or not the capacitor voltage detected by the cell voltage monitor 49 is equal to or higher than the starter start-up enabling voltage a. If Yes (capacitor voltage≥starter start-up enabling voltage a), control proceeds to step S13. If No (capacitor voltage<starter start-up enabling voltage), control returns to step S11.

In step S13, subsequent to the determination in either step S10 or S12 that the capacitor voltage≥starter start-up enabling voltage a, or subsequent to the determination in step S14 that the capacitor 23 is not fully charged, the charge current is switched from current 2 (for example, 20 A) to the normal current 1 (for example, 15 A) to recharge the capacitor 23 with current 1, and control proceeds to step S14.

In step S14, subsequent to the capacitor recharge (with current 1) in step S13, it is determined whether or not the capacitor is fully charged. If Yes (capacitor fully charged), control proceeds to step S15, whereas, if No (capacitor not fully charged) control returns to step S13.

In step S15, subsequent to the determination in either step S9 or S14 that the capacitor is fully charged, after completion of charging by the quick external charge, it is determined whether a predetermined time a has elapsed with a connector plug of a charge station being connected to the quick external charge port 32. If Yes (predetermined time elapsed with port being connected), control proceeds to step S16. If No (before the lapse of the predetermined time α), control ends.

In step S16, subsequent to the determination in step S15 that the predetermined timeα has elapsed with port being connected, or, subsequent to the determination in step S17 that capacitor voltage>voltage b, current 4 is selected as discharge current less than the normal current 3 to discharge the capacitor 23 with current 4 by closing a forced discharge switch 48, and control proceeds to step S17.

In step S17, following the capacitor forcible discharge (with current 4) in step S16, it is determined whether or not the capacitor voltage detected by the cell voltage monitor 49 is equal to or less than the deterioration free voltage b. If Yes (capacitor voltage≤voltage b), control ends. If No (capacitor voltage>voltage b), control returns to step S16.

Now, a description of the operation is given.

The operation in the control unit of the FF plug-in hybrid vehicle of the first embodiment, description is given in Characteristic Operation by Capacitor Power Supply Circuit Configuration, Charge and Discharge Operation of Capacitor Power Supply, Capacitor Charge and Discharge Control Operation During Normal External Charge, and Capacitor Charge and Discharge Control Operation During Quick External Charge, separately.

Characteristic Operation by Capacitor Power Supply Circuit Configuration

For example, in the idle stop vehicles, in the case where the power supply of the starter motor is set to a 12V battery, the power supply circuitry will be configured to be the capacitor power supply circuit configuration of the first embodiment with the DLC unit 45 and the fuse 40 excluded, which is now referred to as Comparative Example.

In this Comparative Example, a single 12V battery is commonly shared by the starter motor and the power source of the vehicle auxiliary equipment. Thus, when the power requirements is high for the vehicle auxiliary equipment, in response to an engine start-up by the starter motor, due to shortage of supply power, at the instant of the engine starting, an instantaneous voltage drop occurs with which the voltage of the vehicle auxiliary equipment abruptly falls.

In contrast, in the first embodiment, the auxiliary load power supply system 39 is configured by connecting the high voltage battery 21 and the 12V battery 22 via the DC/DC converter 37. The DLC unit 45 is configured to include the capacitor charging circuit 41 that is connected by branching from the DC/DC converter 37, and the capacitor connected to the capacitor charging circuit 41. Further, the capacitor power supply circuit is configured by a semiconductor relay 51 as a switch incorporated in the capacity charge circuit 41 between the auxiliary load power supply system 39 and the DLC unit 45.

Through this configuration, while charging the 12V battery 22 and the capacitor 23 by the power from the high voltage battery 21, the 12V battery 22 supplies the necessary power to the 12V system load 36 of the vehicle auxiliary equipment, and the capacitor 23 supplies the necessary power to the starter motor 1. That is, the power supply is not shared between the starter motor 1 and the 12V system load 36. Further, the two power supplies, i.e. the 12V battery 22 and the capacitor 23 are subjected to charge back up by the high voltage battery 21.

Further, without modifying the power supply circuit configuration of the idle stop vehicle of Comparative Example, by adding the DLC unit 45 (capacitor charging circuit 41+capacitor 23), the capacitor power supply circuit may be configured. Thus, since the DLC unit 45 may be added in a similar manner as addition of the auxiliary equipment, it is not necessary for the control of the high voltage battery 21 and the DC/DC converter 37 to be modified from the control of Comparative Example.

Furthermore, when the charge and discharge balance of the auxiliary load power supply system 39 is likely to collapse, the DLC unit 45 (capacitor charging circuit 41+capacitor 23) is capable of controlling the charging current, and may be separated from the auxiliary load power supply system 39 by the semiconductor relay 51 representing a switch. Therefore, by keeping open the semiconductor relay 51 at the time of starter start-up, it is possible to prevent the voltage of the vehicle auxiliary equipment from being decreased suddenly. In addition, there is no need to change the converter capacity of the DC/DC converter 37 and the battery capacity of the 12V battery 22 from the converter capacity and battery capacity set in Comparative Example.

Charge and Discharge Operation of Capacitor Power Supply

With respect to the capacitor power supply circuit, a description is given of "Engine start control operation by the starter motor 1", "Charge control operation to the capacitor 23", and "Discharge control operation from the capacitor 23" respectively performed by the hybrid control module 81.

At the time of an engine start-up by the starter motor 1, in response to the output of the starter start-up command from the hybrid control module 81, when the HEV/IS/Relay 60 is energized, the relay switch 44 is turned on to shift the pinion 57 to a position where the pinion 57 engages with the ring gear 58. Thus, the starter start-up is performed by the starter motor 1 powered by the capacitor 23 to rotate the crankshaft of the transverse engine 2, and the HEV/IS/relay 60 is shut off after a predetermined time has elapsed of the energization. Incidentally, the starter cut-off relay 59, except when the vehicle condition for prohibiting engine start is satisfied, energization is maintained by the body control module 87. Also, the starter relay 61 built in the under-hood switching module 88 is energized only during the selection of the P range. A cut-off state is maintained at the time of selection of the D range and the like other than the P range.

Accordingly, during the engine start-up control by the starter motor 1, as a rule, while the HEV/IS/relay 60 is energized by the starter start command in the starter start-up permission conditions, the starter motor 1 is driven by using the electric power of the capacitor 23 to start up the transverse engine 2.

At the time of charging to the capacitor 23, based on the output of the charge command from the hybrid control module 81, the semiconductor relay 51 of the capacitor charging circuit 41 is closed, and a capacitor charging current is selected. Thus, by introducing the power from the high voltage battery 21 into the capacitor 23 via the DC/DC converter 37, fuse 40, semiconductor relay 51, DC/DC converter 52, a short time charging takes place in accordance with the capacitor charge current. Note that the capacitor charge current is set to current 1 (for example, 15 A) as a base current. Exceptionally, the current 2 (for example, 20 A) is selectable in place of the current 1. Therefore, the charge control of the capacitor 23, while the charge command is output, using the power from the high voltage battery 21, the capacitor 23 is charged with the capacitor charging current selected.

At the time of discharge from the capacitor 23, based on the output of the natural discharge command from the hybrid control module 81, the self-discharge switch 47 of the DLC unit 45 is closed to perform self-discharge from the capacitor 23. Also, based on the output of the forced discharge command from the hybrid control module 81, by closing the forced discharge switch 48 of the DLC unit 45, the forced discharge is carried out from the capacitor 23. In the case of the forced discharge, the discharge amount per unit time is set larger than that of the natural discharge.

Thus, at the time of the forced discharge control of the capacitor 23, while the forced discharge switch 48 is closed on the basis of the forced discharge command, the electric power of the capacitor 23 is converted to the resistance heat, and discharge is performed in a shorter time than the natural discharge. As the capacitor discharge current, the current 3 is set to the basic current. As an exception, the current 4 is provided greater than the current 3.

Thus, at the time of the forced discharge control of the capacitor 23, while the discharge command is being output, the high voltage battery 21 is discharged at the selected capacitor discharge current.

Capacitor Charge and Discharge Control Operation During Normal External Charge

For example, a Comparative Example is set in which, following ignition off and after lapse of a predetermined time (the time considering the case of turning on the ignition due to change-mind), control is executed to reduce the capacitor voltage by forced discharge to a voltage at which deterioration of the capacitor does not proceed.

In the case of this comparative example, because natural discharge takes place due to a balance resistor attached to the capacitor, when leaving as is for twenty four hours, the capacitor voltage will be reduced to approximately 0V. Therefore, upon a renewed ignition ON, it is necessary to recharge the capacitor to the full charge from 0V so that, the starter start-up will be prohibited during the charging time. In other words, the EV running region based on the starter start-up will be narrowed.

In order to shorten the capacitor charging time after the ignition is on, according to the capacitor charge and discharge control in the first embodiment, by using the external charging information which is characteristic of a plug-in hybrid vehicle, the capacitor charging amount (=capacitor voltage) is managed even during the ignition being off.

Here, external charging includes normal external charging and quick external charging. In normal external charging, which takes place primarily at home using nighttime electric power or the like, it takes a long time to charge the high voltage battery 21. Thus, it is assumed that the vehicle would not start or travel for a while. Therefore, during normal external charging, priority is given to capacitor deterioration prevention by recharging the battery by the amount corresponding to the natural discharge.

Below, with reference to FIG. 4, a description is given of the capacitor charging and discharging control operation reflecting this consideration.

First, normal external charging is performed during ignition off, and when the capacitor voltage exceeds the deterioration free voltage b at which deterioration does not proceed, in the flowchart in FIG. 4, control proceeds through step S1, step S2, step S3, step S4 and step S5. Further, as long as the determination that the capacitor voltage>Voltage b is confirmed in step S5, process repeats the flow of step S4 to step S5. IN step S4, a forced discharge is performed with a normal current 3 until the capacitor voltage reaches or falls down to the deterioration free voltage b.

Further, while it is determined that the capacitor voltage≤voltage b in either step S3 or step S5, or, while it is determined that the capacitor voltage>constant voltage c in step S6, in the flowchart of FIG. 4, control repeats the flow from either step S3 or step S5 through step S6 to End.

Subsequently, when it is determined in step S6 that the capacitor voltage≤constant voltage c responsive to decrease in the capacitor voltage due to natural discharge in step S6, control proceeds through step S6, step S7, and step S8 in the flowchart of FIG. 4. Then, while it is determined that the capacitor voltage≠voltage b in step S8, process repeats the flow through step S7 and step S8, and, in step S7, the recharging of the capacitor 23 with the normal current 1 is performed. Then, when, in step S7, it is determined that the capacitor voltage=voltage b, the process proceeds from step S8 to End.

As described above, in the first embodiment, it is configured such that, during ignition off and when external charging is performed by normal external charging, the capacitor voltage is maintained equal to or below the deterioration free voltage b at which deterioration does not proceed (steps S2 to S8 in FIG. 4). Thus, in the case of normal external charging in which the vehicle is assumed not to travel for a while following the external charging operation, the capacitor 23 will be prevented from deteriorated. However, when external charging is performed by normal external charging during ignition off, by maintaining the deterioration free voltage b, it is possible to shorten the charging time compared to a charge time by the charging operation from 0V to full after ignition is turned on.

In the first embodiment, when external charging is normal external charging during ignition off, and the capacitor voltage is equal to or below the deterioration free voltage b, if the capacitor voltage further falls down to a predetermined voltage c far below the deterioration fee voltage b, the capacitor 23 is configured to be recharged (step S6 to step S8 in FIG. 4). Therefore, in the case of normal external charging in which the vehicle would not start running for a while after external charging, when the capacitor voltage exceeds the voltage b, it is possible to reduce the capacitor voltage to the deterioration free voltage b, compared to reducing the capacitor voltage due to natural discharge.

In the first embodiment, when external charging is performed by normal external charging during ignition off, and the capacitor voltage is equal to or below the deterioration free voltage b at which deterioration does not proceed, in response to the capacitor voltage falling below a constant voltage c below the deterioration free voltage b, the capacitor 23 is configured to be recharged (steps S6 to S8 in FIG. 4).

Therefore, when the capacitor voltage falls below the constant voltage c by natural discharge during ignition off, the capacitor voltage can be reliably maintained to the voltage b at which deterioration does not proceed.

Capacitor Charging and Discharging Control Operation During Quick External Charge In contrast to normal external charge, in the case of quick external charging, which is carried out at a charging stand etc. mainly away from home, since the charging of the high voltage battery 21 will be completed within a short time of about 30 minutes, for example, it is assumed that the vehicle starts running immediately after completion of charging. Thus, at the time of quick external charging, priority is given to an immediate starter start-up after ignition on by maintaining the capacitor voltage at or about the starter start-up enabling voltage a. Below, with reference to FIG. 4, a description is given of the capacitor charging and discharging control operation reflecting this situation.

First, at the time the quick external charging is performed during ignition-off, when the capacitor voltage is less than the starter start-up enabling or startable voltage a, in the flowchart of FIG. 4, control proceeds through step S1, step S2, step S9, step S10, step S11 and to step S12. Then, while it is determined in step S12 that the capacitor voltage<starter start-up enabling voltage, control repeats the flow through step S11 to step S12. In step S11, the capacitor is recharged with current 2 higher than the normal current 1 until the capacitor voltage assumes the starter start-up enabling voltage.

Then, when it is determined that the capacitor voltage≥starter startable voltage a in step S10 or step S12, in the flowchart of FIG. 4, the process proceeds from step S10 or step S12 to step S14 via step S13. Subsequently, while it is determined that the capacitor is not fully charged in step S14, process repeats the flow of step S13 to step S14. In step S13, the capacitor recharging is performed until the capacitor voltage will be fully charged.

Then, subsequent to the determination in step S9 or step S14 that the capacitor voltage is fully charged, while it is determined in step S15 that a predetermined time a has not elapsed in the port connection state after completion of the quick external charging, in the flowchart of FIG. 4, the flow proceeds from step S9 or step S14 to End via step S15 is repeated.

Thereafter, when it is determined that the predetermined time a has elapsed with the port connection state maintained after completion of the quick external charging in step S15, in the flowchart of FIG. 4, the process proceeds to steps S15, step S16, and step S17. Further, while it is determined in step S17 that the capacitor voltage≤voltage b, control repeats the flow advancing toward step S16 and step S17. In step S16, the capacitor 23 is forcibly discharged with current 4 less than the normal current 3. Finally, when it is determined that the capacitor voltage≤voltage b in step S17, the process proceeds from step S17 to End.

As described above, in the first embodiment, when external charging is in a quick external charging mode with the ignition off, the capacitor voltage is configured to be maintained at or above the starter start-up enabling voltage at which the starter start-up is available (steps S9 to S14 in FIG. 4). In other words, when external charging is effected by quick external charging during ignition off, by maintaining the capacitor voltage at or above the starter start-up enabling voltage at which the starter start-up is possible, the condition is prepared in which the immediate starter start-up is available after ignition on. As a result, it is possible to shorten the time required for permitting the starter start-up to start the transverse engine by the starter motor 1 following the ignition being on.

In the first embodiment, when external charging is quick external charging during ignition off, upon a certain period of time a having elapsed while connecting the charging plug to the quick external charging port 32 after completion of charging, the capacitor voltage is configured to be reduced to the deterioration free voltage b at which deterioration does not proceed (steps S15 to S17 in FIG. 4).

Therefore, after the quick charging is completed and the vehicle remains standing still without starting to run for 30 minutes, for example, then the capacitor is discharged to the deterioration free voltage b or below. Thus, when using quick external charging instead of normal external charging, it is possible to counteract against deterioration of the capacitor.

In the first embodiment, when external charging is performed in the quick external charging mode and the capacitor 23 has not been fully charged during ignition off, the capacitor will be recharged with current 2 greater than the normal current 1 until the starter start-up enabling voltage a has been achieved. Further, the capacitor is recharged with the normal current 1 between the starter start-up enabling voltage a and full charge (steps S9 to S14, FIG. 4)

Therefore, when the capacitor voltage is less than the starter start-up enabling voltage a, the capacitor voltage may be increased to the starter start-up enabling voltage a in a short time through the recharge control (with current 2) with an emphasis on charge rate. In addition, when the capacitor voltage is positioned in a range between the starter start-up enabling voltage a and full charge, it is possible to increase the capacitor voltage to the full charge voltage via the recharge control (with current 1) by placing emphasis on prevention of the capacitor degradation.

Now, a description is given of the effects.

In the control system for a FF plug-in hybrid vehicle in the first embodiment, it is possible to obtain the following effects.

(1) A control system for a plug-in hybrid vehicle (FF plug-in hybrid vehicle) having a drive system including a starter motor 1, an engine (transverse engine 2), and a motor/generator 4, and a power supply system including a high voltage battery 21 representing power supply of the motor/generator, a capacitor 23 representing power supply to the starter motor 1, and a capacitor charging and discharging control unit (hybrid control module 81) for controlling charging and discharging of the capacitor 23, the high voltage battery being chargeable as an external charging mode by both normal external charging and quick external charging, the control system comprising:

an engine start control unit (hybrid control module 81) that cranks the engine (transverse engine 2) by using the starter motor 1 powered by the capacitor 23 for starter start-up, and a capacitor voltage detection unit (cell voltage monitor 49) for detecting the voltage of the capacitor 23, wherein the capacitor charging and discharging control unit (hybrid control module 81) is configured to maintain the capacitor voltage at and above a starter start-up enabling voltage at which the starter start-up is possible when external charging is carried out by the quick charging during ignition off (FIG. 4).

Therefore, it is possible to shorten the time required for allowing the starter start-up of the engine (transverse engine 2) by the starter motor 1 when the ignition is on.

(2) The capacitor charging and discharging control unit (hybrid control module 81) is configured, when external charging is carried out by quick charging during ignition off, upon a predetermined time α has elapsed upon charging completion with a charge plug connected to a quick external charging port 32, to discharge the capacitor forcibly to a deterioration free voltage b at which deterioration does not proceed (FIG. 4).

Therefore, in addition to the effect of (1), when using quick external charging instead of normal external charging, it is possible to comply with prevention of the capacitor deteriorate.

(3) The capacitor charging and discharging control unit (hybrid control module 81) is configured, when external charging is carried out by quick charging during ignition off and the capacitor 23 is not fully charged during ignition off, to recharge the capacitor with a second charging current (current 2) greater than a normal first charging current (current 1) up until the starter start-up enabling voltage a, while recharging the capacitor with the normal first charging current (current 1) between the starter start-up enabling voltage a and the full charge voltage (FIG. 4).

Therefore, in addition to the effect of (2), when performing quick external charging during ignition off, in which immediate start of the vehicle is assumed after charging is completed, it is possible to achieve the responsiveness in a region in which the capacitor voltage is increased to the starter start-up enabling voltage while achieving, at the same time, the capacitor deteriorate prevention in a region in which the capacitor voltage is increase up to full charge.

(4) The capacitor charging and discharging control unit (hybrid control module 81) is configured, when external charging is carried out by the normal external charge during ignition off, to maintain the capacitor voltage at or below the deterioration free voltage b at which deterioration does not proceed (FIG. 4).

Therefore, in addition to the effects of (1) to (3), when the normal external charge is carried out during a state of ignition off where it is assumed that the vehicle does not start running for a while, it is possible to prevent deterioration of the capacitor 23.

(5) The capacitor charging and discharging control unit (hybrid control module 81) is configured, when external charging is carried out by normal external charging and the capacitor voltage exceeds the deterioration free voltage b during ignition off, to forcibly discharge the capacitor down to the deterioration free voltage b (FIG. 4). Therefore, in addition to the effects of (1) to (4), while normal external charging is carried out during ignition off in which it is assumed that the vehicle will not start for a while after completion of external charging, it is possible to decrease the capacitor voltage to the voltage b at which deterioration does not proceed.

(6) The capacitor charging and discharging control unit (hybrid control module 81) is configured to recharge the capacitor 23, when external charging is carried out by the normal external charge and the capacitor voltage is equal to or below the deterioration free voltage at which deterioration does not proceed, upon the capacitor voltage falling below a predetermined voltage c less than the deterioration free voltage b. Therefore, in addition to the effect of (4) or (5), when, the capacitor voltage is lowered by natural discharge during normal external charging, it is possible to maintain the capacitor voltage at the deterioration free voltage b in the preparation of ignition on.

As described above, the control system of a plug-in hybrid vehicle has been described based on the first embodiment. With respect to the specific configurations, however, the present invention is not limited thereto. Rather, according to the claims in the appended claims, without departing from the gist of the invention, design changes and additions are acceptable.

In the first embodiment, such an example is shown in which, as the capacitor charging and discharging control unit, when external charging is carried out by the quick charging during ignition off, the capacitor voltage is maintained at full charge state. However, when external charging is carried out by the quick charging during ignition off, the capacitor voltage may be maintained at the starter start-up enabling voltage at which starter start-up is possible. Further, the capacitor voltage may be maintained in a range between the starter start-up enabling voltage and the full charge voltage.

In the first embodiment, an example is shown, in which, as the capacitor charging and discharging control unit, controls of recharge and discharge are performed using the capacitor voltage information. However, as the charging and discharging control unit, another example for controlling the recharge and discharge may be available by using capacitance information instead of the capacitor voltage information. In other words, when assuming the charge Q, the electrostatic capacity or capacitance C, and the capacitor voltage V, the charge Q is represented by $Q=C \cdot V$. Thus, when the capacitance C is constant, the charge Q is proportional to the capacitor voltage V. Therefore, by using the charge information instead of the capacitor voltage information, the equivalent controlling may be achieved.

In the first embodiment, an example is shown for using the hybrid control module 81 as the capacitor charge and discharge control unit. However, as the capacitor charge and discharge control unit, a power supply system controller provided independently may be used. Alternatively, a power supply system capacitor charge and discharge control section may be provided in a controller other than the hybrid control module.

In the first embodiment, an example is shown in which the control system according to the present invention is applied to the FF plug-in hybrid vehicle. However, the control system according to the present invention is not limited to the FF plug-in hybrid vehicle, and can also be applied to a FR plug-in hybrid vehicle or a plug-in hybrid 4WD vehicle. In short, the present invention may be applied to a plug-in hybrid vehicle with a capacitor as starting power supply, in which external charging is available to a high voltage battery.

The invention claimed is:

1. A control system for a plug-in hybrid vehicle having a drive system including a starter motor, an engine, and a motor/generator, and a power supply system including a high voltage battery representing power supply of the motor/generator, a capacitor representing power supply of the starter motor, and a capacitor charge and discharge control unit that controls charging and discharging of the capacitor, the high voltage battery being chargeable in an external charging mode by both a first external charging mode and a second external charging mode, the second external charging mode being a mode in which charging is carried out at a faster rate than in the first external charging mode, the control system comprising:

an engine start control unit configured to crank the engine for start-up using the starter motor powered by the capacitor; and a capacitor voltage detection unit configured to detect voltage of the capacitor, the capacitor charging and discharging control unit being configured to maintain the capacitor voltage at and above a starter start-up enabling voltage at which the starter start-up is possible when the external charging is carried out by the second external charging mode during ignition off.

2. The control system for a plug-in hybrid vehicle as claimed in claim 1, wherein
the capacitor charging and discharging control unit is configured, when the external charging is carried out by the second external charging mode during ignition off, upon a predetermined time having elapsed with a charge plug connected to a second external charging port subsequent to charge completion, to discharge the capacitor forcibly to a deterioration free voltage at which deterioration does not proceed.

3. The control system for a plug-in hybrid vehicle as claimed in claim 1, wherein
the capacitor charging and discharging control unit is configured, when the external charging is carried out by the second external charging mode during ignition off and the capacitor is not fully charged during ignition off, to recharge the capacitor with a second charging current greater than a first charging current up until the starter start-up enabling voltage, while recharging the capacitor with the first charging current between the starter start-up enabling voltage and a full charge voltage.

4. The control system for a plug-in hybrid vehicle as claimed in claim 1, wherein
the capacitor charging and discharging control unit is configured, when the external charging is carried out by the first external charging mode during ignition off, to maintain the capacitor voltage at or below the deterioration free voltage at which deterioration does not proceed.

5. The control system for a plug-in hybrid vehicle as claimed in claim 4, wherein
the capacitor charging and discharging control unit is configured, when the external charging is carried out by the first external charging mode and the capacitor voltage exceeds the deterioration free voltage during ignition off, to forcibly discharge the capacitor down to the deterioration free voltage.

6. The control system for a plug-in hybrid vehicle as claimed in claim 4, wherein
the capacitor charge and discharge control unit is configured to recharge the capacitor, when the external charging is carried out by the first external charging mode and the capacitor voltage is equal to or below the deterioration free voltage at which deterioration does not proceed, upon the capacitor voltage falling below a predetermined voltage less than the deterioration free voltage.

7. The control system for a plug-in hybrid vehicle as claimed in claim 2, wherein
the capacitor charging and discharging control unit is configured, when the external charging is carried out by the second external charging mode during ignition off and the capacitor is not fully charged during ignition off, to recharge the capacitor with a second charging current greater than a first charging current up until the starter start-up enabling voltage, while recharging the capacitor with the first charging current between the starter start-up enabling voltage and a full charge voltage.

8. The control system for a plug-in hybrid vehicle as claimed in claim 2, wherein
the capacitor charging and discharging control unit is configured, when the external charging is carried out by the first external charging mode during ignition off, to maintain the capacitor voltage at or below the deterioration free voltage at which deterioration does not proceed.

9. The control system for a plug-in hybrid vehicle as claimed in claim 3, wherein
the capacitor charging and discharging control unit is configured, when the external charging is carried out by the first external charging mode during ignition off, to maintain the capacitor voltage at or below the deterioration free voltage at which deterioration does not proceed.

10. The control system for a plug-in hybrid vehicle as claimed in claim 5, wherein
the capacitor charge and discharge control unit is configured to recharge the capacitor, when the external charging is carried out by the first external charging mode and the capacitor voltage is equal to or below the deterioration free voltage at which deterioration does not proceed, upon the capacitor voltage falling below a predetermined voltage less than the deterioration free voltage.

* * * * *